(12) United States Patent
Bower (10) Patent No.: US 9,139,454 B2
(45) Date of Patent: Sep. 22, 2015

(54) TURBULENCE INDUCING DEVICE AND METHODS OF USE

(75) Inventor: David Bower, Bennett, CO (US)

(73) Assignee: En-Spire Technologies, LLC, Westmintser, CO (US)

( * ) Notice: Subject to any disclaimer, the term of this patent is extended or adjusted under 35 U.S.C. 154(b) by 0 days.

(21) Appl. No.: 14/003,662

(22) PCT Filed: Feb. 27, 2012
(Under 37 CFR 1.47)

(86) PCT No.: PCT/US2012/026806
§ 371 (c)(1),
(2), (4) Date: May 1, 2014

(87) PCT Pub. No.: WO2012/161827
PCT Pub. Date: Nov. 29, 2012

(65) Prior Publication Data
US 2014/0311990 A1    Oct. 23, 2014

Related U.S. Application Data

(60) Provisional application No. 61/446,977, filed on Feb. 25, 2011.

(51) Int. Cl.
*B01D 21/01* (2006.01)
*B03D 3/00* (2006.01)
(Continued)

(52) U.S. Cl.
CPC ............... *C02F 1/34* (2013.01); *B01F 15/0254* (2013.01); *C02F 1/52* (2013.01); *C02F 1/5245* (2013.01); *C02F 1/72* (2013.01); *C02F 3/1294* (2013.01); *E21B 43/34* (2013.01); *C02F 2301/024* (2013.01)

(58) Field of Classification Search
None
See application file for complete search history.

(56) References Cited

U.S. PATENT DOCUMENTS

| 5,904,840 A | 5/1999 | Dibella |
| 2004/0118752 A1* | 6/2004 | Simon et al. .................. 209/143 |

(Continued)

FOREIGN PATENT DOCUMENTS

| WO | WO 2007003053 A1 * | 1/2007 | ............... C02F 1/28 |
| WO | WO2007074379 | 7/2007 | |

(Continued)

OTHER PUBLICATIONS

Stefani, et al., Evaluation of a Novel Water Purification System, Mechanical Engineering Design Projects Program—The University of Texas at Austin, Spring 2014, 20 pgs.

*Primary Examiner* — Nam Nguyen
*Assistant Examiner* — Clare Perrin
(74) *Attorney, Agent, or Firm* — Merchant & Gould P.C.

(57) ABSTRACT

A turbulence inducing device is described. Embodiments of the device include a nozzle (135), a vessel assembly (110), and an obstructer (140). The vessel assembly typically includes an open ended main channel (115) surrounded by a housing. In typical operation, fluid under positive pressure is forced through the nozzle into the main channel. Disposed at the main channel outlet, the obstructer is adapted to deflect the flowing fluid and induce turbulence that can result in cavitation when the fluid is a liquid. When the liquid includes water, cavitation can result in production of reactive species that oxidatively modify contaminants in the water. Embodiments of the turbulence inducing device can be used to reduce contamination of produced water, the produced water arising from hydrocarbon extraction or exploration.

33 Claims, 4 Drawing Sheets

(51) Int. Cl.
- *C02F 1/52* (2006.01)
- *B01F 15/00* (2006.01)
- *B01D 35/00* (2006.01)
- *B01F 3/04* (2006.01)
- *C02F 1/34* (2006.01)
- *E21B 43/34* (2006.01)
- *C02F 3/12* (2006.01)
- *B01F 15/02* (2006.01)
- *C02F 1/72* (2006.01)
- *C02F 1/68* (2006.01)
- *B01D 15/00* (2006.01)
- *B01J 20/00* (2006.01)

(56) References Cited

U.S. PATENT DOCUMENTS

| | | | |
|---|---|---|---|
| 2005/0178733 A1* | 8/2005 | Conger et al. | 210/760 |
| 2008/0074944 A1* | 3/2008 | Blechschmitt et al. | 366/101 |
| 2010/0175873 A1 | 7/2010 | Milkovisch et al. | |

FOREIGN PATENT DOCUMENTS

| WO | WO2008063074 | 5/2008 | |
|---|---|---|---|
| WO | WO 2010128915 A1 * | 11/2010 | F15D 1/00 |

\* cited by examiner

TURBULENCE INDUCING DEVICE AND METHODS OF USE

This application claims the benefit of U.S. Provisional Application No. 61/446,977 filed 25 Feb. 2011, and PCT Application No. PCT/US12/26806 filed Feb. 27, 2012, which are incorporated herein by reference in their entirety.

BACKGROUND

Removal of contaminants from water is a ubiquitous challenge, and contaminants in produced water from oil and gas (hydrocarbon) extraction are particularly problematic. Disposal of contaminated produced water is a major expense of hydrocarbon extraction. However, reduction in levels of contamination in produced water can reduce expenses associated with disposal of produced water.

Currently, in the absence of cost-effective means for decontaminating produced water, hydrocarbon well owners and operators incur significant difficulty and expense in order to dispose of contaminated produced water, sometimes trucking the water to disposal locations relatively distant from hydrocarbon wells. Current methods of decontaminating produced water are typically ineffective or expensive.

Evaporation of produced water can be an effective means of disposal. However, natural evaporation tends to be slow, which necessitates large holding ponds, and also practically stops during cold weather. The evaporation can be hastened by heating or dispersing the water, but heating tends to be energy intensive, and dispersion can require that the water first be decontaminated.

DETAILED DESCRIPTION

Exemplary embodiments of a turbulence inducing device of the present invention include a vessel assembly comprising a main channel surrounded by a housing. The main channel is typically open at opposite ends. The main channel comprises a constriction chamber disposed at a first end of the vessel assembly, and a diffusion chamber, between which resides a throat. The diffusion chamber is typically, but not necessarily, disposed at a second end of the vessel assembly.

Embodiments of the turbulence inducing device further comprise a nozzle disposed proximate the first end of the vessel assembly, and an obstructer disposed proximate the second end of the vessel assembly. The obstructer impedes and deflects fluid flow that impacts thereupon, but does not typically completely block the fluid flow. An inlet gap typically resides between the nozzle and the vessel assembly. The inlet gap is a particular species of a more generic structure, an injection aperture. In some embodiments, the nozzle is directly coupled to the vessel assembly, with the inlet gap comprising voids in the direct coupling between the nozzle and the vessel assembly. In other embodiments the nozzle is completely separated from the vessel assembly by the inlet gap. In some embodiments, the inlet gap is absent entirely and the nozzle is coupled to the vessel assembly without any voids in the coupling.

An outlet gap typically resides between the vessel assembly and the obstructer. In some embodiments, the obstructer is directly coupled to the vessel assembly, with the outlet gap comprising voids in the direct coupling between the obstructer and the vessel assembly. In other embodiments the obstructer is completely separated from the vessel assembly by the outlet gap. In still other embodiments, the obstructer is entirely absent from the turbulence inducing device. The obstructer may be alternatively referred to as an accelerator, kinetic reactor, kinetic reactor/accelerator, deflector, or obstruction device. In some embodiments, the obstructer is disposed proximate the nozzle, and the vessel assembly is absent.

In typical operation, a first fluid under positive pressure flows through the nozzle, which constricts fluid flow and thus increases fluid flow velocity. The first fluid is typically, but not necessarily, a liquid, and the liquid can be produced water from hydrocarbon extraction or exploration. The nozzle can create a vena contracta in the fluid flow, and cavitation may result. Produced water is typically delivered to the nozzle at relatively high pressure, the relatively high pressure being higher that is typically employed with eductors and jet pumps used to transport fluid or created a partial vacuum.

The first fluid typically flows into the main channel after exiting the nozzle, where the fluid encounters the constriction chamber. A cross-sectional area of the constriction chamber diminishes along a direction of fluid flow (i.e. the constriction chamber converges), and the constriction chamber thus constricts the flow of fluid as it proceeds through the constriction chamber. Accordingly, fluid flow velocity typically increases as the fluid flows through the constriction chamber. The first fluid typically flows from the constriction chamber into a throat region of the main channel, and then into the diffusion chamber. A cross-sectional area of the diffusion chamber increases along the direction of fluid flow (i.e. the diffusion chamber diverges), and flow velocity of the fluid therefore typically decreases in the diffusion chamber. The fluid flow is typically turbulent, and cavitation may be induced in the main channel.

After flowing through the diffusion chamber, the fluid exits the vessel assembly, whereupon the fluid typically encounters the obstructer, which resides in the fluid flow path proximate the second end of the vessel assembly. The fluid is typically deflected by the obstructer, whereupon the fluid flows through the outlet gap. The obstructer typically induces turbulence in the fluid flow and can induce cavitation.

In typical operation, the turbulence inducing device acts as an eductor, wherein a second fluid is drawn into the main channel through the inlet gap or other injection aperture, by the action of the first fluid. Accordingly, the first fluid acts as a motive fluid whose motive energy draws the second fluid along a pressure gradient into the main channel. In some embodiments, the second fluid is injected into the main channel under positive pressure.

The first and second fluids may have the same composition or may have different compositions. The first fluid can be, but is not necessarily, produced water contaminated with organic and inorganic materials. Examples of organic compounds typically include, but are not limited to, petroleum hydrocarbons, benzene, toluene, ethylbenzene, and xylenes. Benzene, toluene, ethylbenzene, and xylenes can be referred to collectively as BTEX. Inorganic materials include, but are not limited to, salts, metals, and heavy metals.

The second fluid is typically, but not necessarily, an oxygenated gas. Oxygenated gases include, but are not limited to, air and oxygen supplemented air.

Where cavitation is induced, it is believed that the cavitation results in generation of hydroxyl radicals or other reactive species that are reactive toward organic compounds and other oxidizable substances. In some embodiments, contaminants in a fluid flocculate, coagulate, precipitate or otherwise separate from fluid after treatment with the turbulence inducing device. Separation adjuvants, including but not limited to flocculants, coagulants, or precipitants, can be added to enhance separation.

Embodiment of turbulence inducing devices can facilitate phase separation of hydrophobic/aqueous mixtures, such as oil/water mixtures, by disrupting emulsions. According, the incompatible phases can form distinct phases, rather that remaining intermixed, following treatment with embodiments of the device.

Embodiments of the turbulence inducing device can increase the temperature of a first fluid that is pumped or otherwise propelled through the device. In some embodiments, the fluid is water or other liquid, which is dispersed into droplets by the action of the turbulence inducing device as the liquid emerges from the device. A second fluid comprising air or other gas can be introduced into the first fluid through the injection ports, thereby entraining the air or other gas in the first fluid. The turbulence inducing device is thus adapted to facilitate evaporation of water or other liquid, the heated and dispersed liquid, replete with entrained gas, being more prone to vaporization. Additional energy may be applied to the fluid in order to enhance vaporization of the fluid.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment," "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The terms "directly coupled" or "coupled directly," as used in this specification and appended claims, refer to a physical connection between identified elements, components, or objects, in which no other element, component, or object resides between those identified as being directly coupled.

The terms "removable", "removably coupled", "readily removable", "readily detachable", "detachably coupled", "separable," "separably coupled," and similar terms, as used in this specification and appended claims, refer to structures that can be uncoupled from an adjoining structure with relative ease (i.e., non-destructively, and without a complicated or time-consuming process), and that can also be readily reattached or coupled to the previously adjoining structure.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

The term "nozzle," as used in this specification and appended claims, refers to a device or structure comprising an enclosure or housing surrounding a bore disposed therethrough, which constricts flow of a fluid, and thus increases velocity of the fluid, as the fluid leaves a chamber, hose, line, pipe, or similar structure, through an orifice. A nozzle typically creates a vena contracta in a fluid that flows through the nozzle.

The terms "inject," "injected," "injection," and similar terms, as used in this specification and appended claims, refer to fluid flow across a pressure gradient into a chamber, cavity, or similar structure. The pressure gradient can be produced by: i) reduction in pressure, such as where air is aspirated into a vessel assembly main channel by the motive force of produced water flowing through the main channel, or ii) increasing pressure, such as where air is forced by positive pressure through an injection aperture into a vessel assembly main channel through an injection aperture.

The term "cross-sectional area," as used in this specification and appended claims, refers to an area of a cross-section of a channel, chamber, bore, or other cavity, the area residing in a plane that intersects the channel, chamber, bore, or other cavity perpendicular to the direction of the flow of fluid the channel, chamber, bore, or other cavity is designed and adapted to receive therethrough. The direction of flow of fluid is typically along a longitudinal axis of the channel, chamber, bore, or other cavity. The flow of fluid refers to the overall flow of fluid in the channel, chamber, bore, or other cavity, and does not refer to turbulence, micro-eddies and other micro-flow, cross-currents, or other secondary fluid flow that can occur within the overall fluid flow.

The term "produced water," as used in this specification and appended claims, refers to water that flows from or is extracted from the ground as part of oil and natural gas extraction or exploration. Injection water that is subsequently recovered or flows out of the ground is considered produced water. Fluid injected into the ground that is subsequently recovered or flows out of the ground as a component of hydraulic fracturing is produced water for the purposes of this specification and appended claims.

The term "separation adjuvant," as used in this specification and appended claims, refers to compositions added to a liquid to facilitate physical separation of contaminants contained therein, from the liquid. Separation adjuvants include, but are not limited to, flocculants, coagulants, precipitants, ion exchange resins and other resins, affinity media, inclusion media, and the like. Separation adjuvants typically bind to or otherwise sequester contaminants by mechanisms such as, but not limited to, absorption, adsorption, ion exchange, ionic attraction, covalent bonding, inclusion complexing, and affinity binding. Physical separation includes, but is not limited to, filtration, centrifugation, floatation, settling, precipitation, flocculation, coagulation, charge modification, and the like. Selective membrane separation such as reverse osmosis is not considered a physical separation for the purposes of this specification and appended claims. Contaminants include, but are not limited to dissolved solids and suspended solids.

The term "oxygenated gas," as used in this specification and appended claims, refers to a gas phase mixture or solution comprising diatomic oxygen ($O_2$) or ozone ($O_3$) at a level of at least 1% by weight.

The term "air," as used in this specification and appended claims, refers to the commonly recognized gas that surrounds the surface of the earth and comprises approximately 78.08% $N_2$, 20.95% $O_2$, 0.934% Ar, and 0.0383% $CO_2$.

The term "oxygen enriched air," as used in this specification and appended claims, refers to a air that has been supplemented with $O_2$ such that it comprises greater than 21.1% $O_2$ by weight.

The term "positive pressure," as used in this specification and appended claims, refers to pressure above an ambient or atmospheric pressure. Ambient pressure is typically, but not necessarily, about one atmosphere.

The term "combustible gas," as used in this specification and appended claims, refers to a gas comprising an oxidizable composition in gas phase.

A First Embodiment Turbulence Inducing Device

Figure 1:
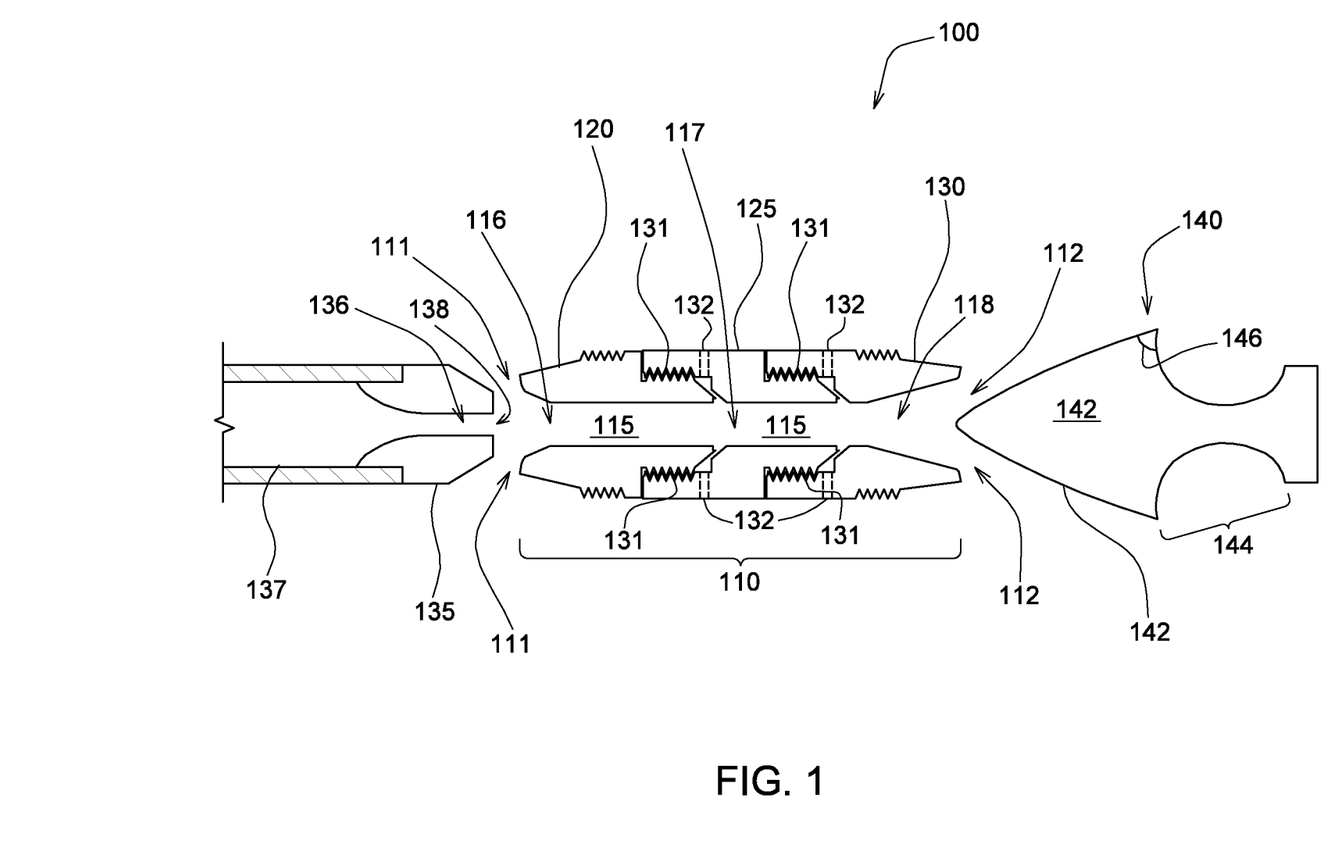
FIG. 1 is a side cross-section view of an exemplary embodiment of a turbulence inducing device.

A first embodiment turbulence inducing device 100 is illustrated in FIG. 1. The first embodiment turbulence inducing device comprises a vessel assembly 110 through which extends a main channel 115. The main channel comprises a constriction chamber 116, a throat 117, and a diffusion chamber 118.

The vessel assembly 110 of the first embodiment turbulence inducing device 100 comprises three separable sections. An inlet section 120, within which resides the constriction chamber 116, is separably and directly coupled to a middle section 125, within which resides the throat 117. The middle section 125 is separably and directly coupled to a diffuser section 130, within which resides the diffusion chamber 118. Housing couplings 131 reside at each of the junctions between inlet, throat, and diffuser sections. The housing couplings are threaded.

Each of the inlet section 120, middle section 125, and diffuser section 130 comprise a housing surrounding a channel, and the housings of the inlet, middle, and diffuser sections collectively form the vessel assembly housing. In some embodiments, the vessel assembly housing is a single unitary piece, rather than being formed from separable sections. Transverse ports 132 pass through the housing of the vessel assembly 110, thus providing fluid communication between the main channel 115 and a vessel assembly exterior. The transverse ports are a particular species of injection aperture.

The vessel assembly of the first embodiment is typically approximately 11.22 inches long, and the throat 117 of the main channel 115 has a cylindrical shape with a diameter of approximately 0.35 inch. In other embodiments, the throat of the main channel can have larger or smaller diameters. As illustrated in FIG. 1, the constriction chamber 116 is conical, being flared at the main channel inlet, where the constriction chamber diameter is approximately 0.55 inch, and tapering to a smaller diameter (0.35 inch) as the constriction chamber diminishes and merges with the throat 117. The diffusion chamber 118 is also conical, a diameter of the diffusion chamber being at a minimum (0.35 inch) where the throat 117 merges with the diffusion chamber, the diameter (and hence the diffusion chamber cross-sectional area) growing larger as the diffusion chamber enlarges toward the main channel outlet, where the diffusion chamber diameter is approximately 0.65 inch.

The housing of the first embodiment vessel assembly comprises mostly brass, and fluid within the main channel is thus in contact with the brass. In some embodiments, the vessel assembly housing comprises copper or iron. Where fluid in a main channel contacts copper or iron, Fenton type reactions can occur.

The first embodiment turbulence inducing device 100 further comprises a nozzle 135 disposed proximate the constriction chamber 116. A nozzle bore 136 passes through a center of the nozzle, the nozzle bore being substantially cylindrical and having a diameter of approximately 0.1875 inch at the nozzle discharge orifice 138. The nozzle is coupled directly to an inlet line 137, the inlet line being adapted to deliver fluid under positive pressure to the nozzle. In some embodiments, the nozzle bore includes helical grooves or ridges in order to impart spiral flow characteristics to liquid flowing therethrough.

Embodiments of turbulence inducing devices typically, but not necessarily, have nozzle bores that are smaller at the nozzle discharge orifice than the smallest area of the main channel of the vessel assembly with which the nozzle is paired. Nozzle bore and main channel size refers to cross-sectional areas of the nozzle bore or main channel. The smallest area of the main channel typically resides at the throat, or where the constriction chamber reaches a minimum cross-sectional area. Main channel smallest area to nozzle discharge orifice area ratios are preferably greater than 1:1, more preferably between 1:1 and 16:1, still more preferably between 2:1 and 8:1, and most preferably about 4:1.

An inlet gap 111 resides between the nozzle 135 and the vessel assembly housing. The inlet gap of the first embodiment is adjustable, and is typically, but not necessarily adjusted in a range between 0 and 1 inch. The nozzle of the first embodiment consists essentially of mild steel. Some embodiments of nozzles comprise other materials.

The turbulence inducing device further comprises an obstructer 140 disposed proximate the diffusion chamber 118, an outlet gap 112 residing between the diffusion chamber and the obstructer. The obstructer comprises a generally conical section 142 disposed proximate a concave section 144. A transition from the conical section to the concave section is relatively abrupt, a transition angle 146 between the conical and concave sections being less than 90 degrees.

The outlet gap 112 is adjustable, and is typically, but not necessarily, adjusted in a range between about 0 and 4 inches. With the outlet gap 112 set at approximately 0.02 inch and a water flow rate of about 3.0 gallons per minute, it is thought that turbulent flow and cavitation are induced. The obstructer 140 of the first embodiment consists essentially of 316 stainless steel. Some embodiments of obstructers comprise other materials.

The first embodiment turbulence inducing device further comprises an outer sheath surrounding the nozzle, vessel assembly, and obstructer. The outer sheath of the first embodiment is not illustrated in FIG. 1 in order to more clearly depict the structures contained therein. However, the outer sheath of the first embodiment turbulence inducing device appears and functions substantially similar to the outer sheath 350 of the second embodiment turbulence inducing device 300 illustrated in FIG. 3.

In some embodiments, the entire turbulence inducing device is submerged in a fluid to be treated. For instance, embodiments are submerged completely in produced water in order to treat the produced water.

Exemplary embodiments of turbulence inducing devices typically, but not necessarily, comprise metal or metal alloys, including but not limited to zinc, copper, iron, magnesium, chromium, and molybdenum. Variations include embodiments comprising composites, high impact plastics, polymers, thermoplastics, or wood. Polymer include, but are not limited to, nylon, polyvinyl chloride (PVC), acrylonitrile butadiene styrene (ABS), polyethylene terephthalate (PET), polyetheretherketone (PEEK), polyimide, polycarbonate, polyaniline, acrylate or methacrylate polymers, fluorinated polymers such as polytetrafluoroethylene or polyfluoroethylenepropylene, and polyolefins such as polyethylene (PE), polypropylene (PP) or polybutylene (PB). Composites include, but are not limited to, carbon or glass fibers imbedded in resin. In some embodiments, a turbulence inducing device sheds metal ions into a water stream flowing through the device. The metal ions can alter electrochemical or conductive characteristics of the water, participate in chemical reactions, and can also influence water pH.

A First Method of Treating Contaminated Water

Figure 2:
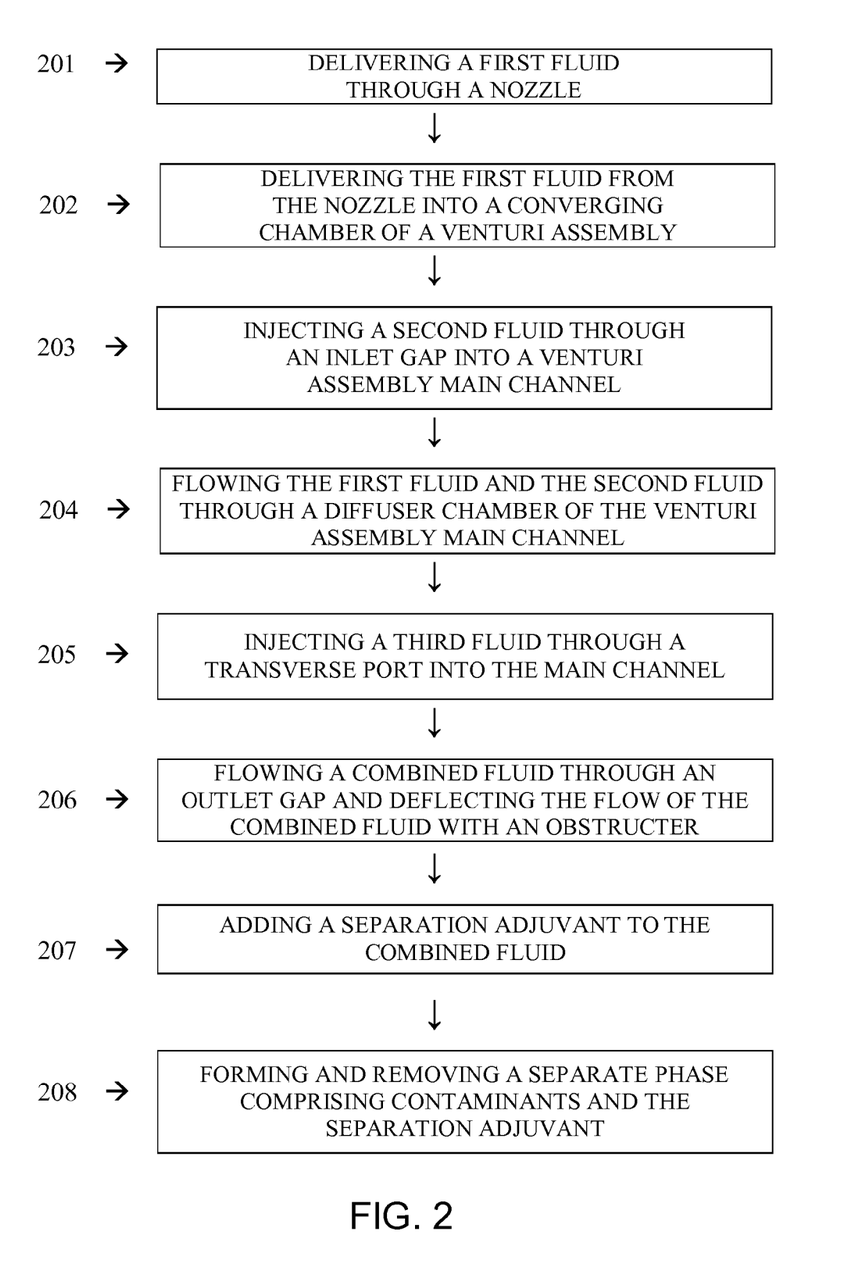
FIG. 2 is a flow chart illustrating an exemplary method of using an embodiment of a turbulence inducing device.

A first method of treating contaminated water, illustrated in a flow diagram in FIG. 2 is performed using the first embodiment turbulence inducing device 100 (illustrated in FIG. 1) as follows. In a first operation 201, a first fluid is pumped through the nozzle 135 at a flow rate falling in a range of 2.0 gallons per minute to 4.0 gallons per minute. The first fluid is typically delivered to the nozzle at a pressure greater than 300 pounds per square inch (psi). The first fluid of the first method of treating contaminated water is produced water that varies from relatively highly contaminated to relatively clean water.

In a second operation 202, the produced water flows through the nozzle 135, subsequently flowing into the constriction chamber 116 of the vessel assembly 110. The water flow is constricted as it passes through the constriction chamber 116, wherein the conical constriction chamber tapers to the cylindrical throat 117. The water flow accelerates as the main channel 115 constricts in the constriction chamber 116, and cavitation in the main channel can result. It is believed that hydroxyl radicals can be generated as a result of the cavitation.

In a third operation 203, a second fluid is injected into the main channel 115 through the inlet gap 111 as the first fluid flows from the nozzle 135 into and through the constriction chamber 116. The second fluid is typically injected by aspiration caused by the motive force of the first fluid flowing out of the nozzle and into the main channel. The second fluid of the first method of treating contaminated water is an oxygenated gas, namely air. Variations include a second fluid comprising combustible gases such as, but not limited to, methane, ethane, propane, and other alkanes. Motive force of the first fluid creates a pressure gradient that draws the second fluid through the inlet gap into the main channel.

With the inlet gap 111 set at approximately 0.12 inch, and a water flow rate of about 3.0 gallons per minute, a vacuum of about 5.0 inches mercury can be created at the inlet gap 111, thus aspirating a second fluid through the inlet gap into the main channel. With the inlet gap 111 set at approximately 0.40 inch and a water flow rate of about 3.0 gallons per minute, a vacuum of about 29 inches mercury can be created at the inlet gap. With the inlet gap 111 set at approximately 1.0 inch and a water flow rate of about 3.0 gallons per minute, a vacuum created at the inlet gap is typically indistinguishable from zero.

In a fourth operation 204, the produced water subsequently flows through the throat 117 and through the diffusion chamber 118, the water flow velocity decreasing as the diverging conical diffusion chamber diameter increases.

In a fifth operation 205, a third fluid is injected into the main channel 115 through a transverse port 132. Motive force of fluid through the main channel creates a pressure gradient that draws the third fluid through the transverse ports into the main channel. The third fluid is a gas, namely air.

In a sixth operation 206, a combined fluid comprising the first, second, and third fluids exits the main channel 115 of the vessel assembly 110 by flowing through the outlet gap 112. The combined fluid is deflected by the obstructer 140 as it approaches, enters, or exits the outlet gap.

In a seventh operation 207, separation adjuvants are added to the first fluid, the second fluid, or the combined fluid. The separation adjuvants of the sixth operation include ferric chloride ($FeCl_2$) and Magnafloc® synthetic flocculent from BASF Corporation (Tucson, Ariz.). Other separation adjuvants include anionic, cationic, and neutral flocculants and precipitants. A basifying agent is also added in the seventh operation in order to raise the pH of the combined fluid. The basifying agent of the seventh operation is sodium hydroxide (NaOH). In some embodiments, acidifying agents are added to the fluids in order to lower the pH.

In an eighth operation 208, the separation adjuvants, along with contaminants formerly residing in the first fluid, second fluid, third fluid, or combined fluid, form a separate phase from the combined fluid, and are filtered, centrifuged, or otherwise removed from the combined fluid.

A Second Method of Treating Contaminated Water

A second method of treating water is substantially similar to the first method, but does not include the fifth operation. Accordingly, for the second method: (i) the first fluid is produced water, (ii) the second fluid is air, and (iii) there is no third fluid injected through the transverse ports. Water treated by the first embodiment turbulence inducing device 100, using the second method of treating contaminated water, results in a reduction of listed contaminants as shown in Table I.

TABLE I

| ANYLATE | BEFORE TREATMENT | TREATED SAMPLE |
|---|---|---|
| pH | 5.10 | 8.56 |
| P alkalinity (mg/L as $CaCO_3$) | 0.0 | 660 |
| M alkalinity (mg/L as $CaCO_3$) | 40 | 1,010 |
| Chloride (mg/L as $Cl^-$) | 163,000 | 86,000 |
| Sulfate (mg/L as $SO_4^{2-}$) | 181 | 1,071 |
| Sodium (mg/L as $Na^+$) | 77,860 | 40,420 |
| Potassium (mg/L as $K^+$) | 7,225 | 3,842 |
| Calcium (mg/L as $Ca^{2+}$) | 17,560 | 8,512 |
| Magnesium (mg/L as $Mg^{2+}$) | 933 | 445 |
| Barium (mg/L as $Ba^{2+}$) | 28 | 9.0 |
| Strontium (mg/L as $Sr^{2+}$) | 4,487 | 728 |
| Iron, Ferrous (mg/L as $Fe^{2+}$) | 57 | 0.0 |
| Iron, Total (mg/L as Fe) | 453 | 0.1 |
| Conductivity (μohms) | 376,800 | 166,200 |
| Osmotic Pressure (mOsm/Kg) | 8,550 | 4,356 |
| Total Hardness (mg/L as $CaCO_3$) | 47,723 | 23,103 |
| Total Suspended Solids (mg/L) | 1,165 | 260 |
| Specific Gravity (g/mL) | 1,170 | 1.081 |
| ΔATP (rlu) - Microbiological Content | 178 | 3 |
| Microbiological Content | High | Low |
| Langelier Saturation Index (LSI) | −0.61 | 3.51 |
| Langelier Potential | corrosive | scaling |

A Third Method of Treating Contaminated Water

A third method of treating contaminated water is performed using the first embodiment turbulence inducing device 100 (illustrated in FIG. 1) as follows. In a first operation of the third method, produced water is pumped through the nozzle 135 at flow rates in a range of 2.0 gallons per minute to 4.0 gallons per minute and back pressures of 300-900 psi.

In a second operation of the third method, the produced water flows through the nozzle 135 into the constriction chamber 116 of the vessel assembly 110. The water flow accelerates as the main channel 115 constricts in the constriction chamber 116.

In a third operation, air is aspirated into the main channel 115 through the inlet gap 111 as the produced water flows from the nozzle 135 into and through the constriction chamber 116.

In a fourth operation of the third method, the produced water subsequently flows through the throat 117 and through the diffusion chamber 118, the water flow velocity decreasing as the diverging conical diffusion chamber diameter increases.

In a fifth operation the combined fluid, comprising the first and second fluids, exits the main channel 115 of the vessel assembly 110 by flowing through the outlet gap 112. The combined fluid is deflected by the obstructer 140 as it approaches or enters the outlet gap.

In a sixth operation of the third method, formerly dissolved solids are precipitated or co-precipitated and removed using physical separation such as, but not limited to, filtration, centrifugation, floatation, settling, precipitation, flocculation, coagulation, charge modification, and the like. Water treated by the first embodiment turbulence inducing device 100, using the third method of treating contaminated water, results in a reduction of listed contaminants as shown in Table II.

added to produced water to facilitate oxidation. Other oxidants that are contemplated for addition to the produce water include, but are not limited to, chlorine and other halogens, hypochlorite and other hypohalite compounds, hypochlorous acid, hydroxyl radicals, inorganic peroxides, nitric acid and other nitrate compounds, sulfuric and persulfuric acids, chlorite, chlorate, perchlorate, hexavalent chromium compounds, permanganate compounds, perborate compounds, various oxide compounds, Tollen's reagent, Fenton's reagent, 2,2'-Dipyridyldisulfide (DPS).

Cavitation can also induce thermo-chemical decomposition, which can result from extremely high temperatures and pressures that are typically created where bubbles collapse during cavitation. It is also thought that fluids in the vicinity of bubbles formed during cavitation can reach a critical or supercritical state, which can alter the solubility of substances residing near the bubbles. Accordingly, inorganic substances may become relatively insoluble where cavitation is abundant, and organic compounds may become more soluble. Where inorganic substances precipitate they can induce co-precipitation of otherwise relatively soluble components. For instance, precipitation of Al(III) can facilitate co-precipitation of metals such as Co(II), Ni(II), and Zn(III) from aqueous solution, where the metals are usually substantially soluble.

Oxidation and other chemical reactions can also be induced or enhanced by increased intermolecular interactions created through increased mixing. The increased mixing typically results from turbulent flow.

Microbiological content can be reduced by processes such as, but not limited to, physically disrupting microorganisms,

TABLE II

| | BEFORE TREATMENT | | | AFTER TREATMENT |
|---|---|---|---|---|
| | Low | High | Average | |
| pH | 5.7 | 7.5 | 6.6 | 7.1 |
| Specific Gravity | 1.002 | 1.105 | 1.0535 | 1.001 |
| Total Suspended Solids - ppm | 20 | 121000 | 60510 | 1 |
| Total Dissolved Solids - $\mu$S/cm | 350 | 250000 | 117175 | 12 |
| Ca - ppm | 61 | 832 | 446.5 | 14 |
| Mg - ppm | 32 | 132 | 82 | 3 |
| Barium - ppm | 8.4 | 63.4 | 35.9 | 0.1 |
| Strontium - ppm | 23 | 2040 | 1031.5 | 0.12 |
| $H_2S$ - ppm | 0.1 | 1160 | 600.05 | 0.1 |
| Turbidity - NTU | 59 | 990 | 524.5 | 1 |
| Color | green | black | | clear |
| Odor | none | noxious | | none |
| Chemical $O_2$ Demand - ppm | 505 | 9440 | 4972.5 | 101 |
| oil & Grease - ppm | 3.1 | 350000 | 175001.6 | 2 |
| BTEX - ppm | 10 | 42000 | 21005 | 10 |
| Total Petroleum Hydrocarbons - ppm | 980 | 25000 | 12990 | 10 | ppm = parts per million, which can also be expressed as milligrams per kilogram
$\mu$S/cm = micro Siemens per centimeter, a unit of electrical conductance. One $\mu$S/cm is equivalent to approximately 0.640 ppm dissolved solids.
NTU = nephelometric turbidity units.

It is thought that removal of contaminants from the produced water is facilitated by one of more of the following mechanisms. Cavitation can be induced by flow of aqueous medium through the nozzle, the main channel, or by turbulence created by the obstructer. It is thought that cavitation can induce oxidative modification of oxidizable species in the aqueous medium. Oxidation products can have reduced solubility and may thus precipitate or co-precipitate, or can become volatile and leave the aqueous medium as a gas. Oxidation can be facilitated by reactive oxygen species such as, but not limited to, hydroxyl radicals, ozone, and hydrogen peroxide. Hydroxyl radicals can be generated in situ by cavitation. In some embodiments, reactive oxygen species can be through oxidative attack by reactive oxygen species, and by high temperature and pressure at bubble collapse foci. Physical disruption can result from shear forces created by turbulent flow, or by shock waves generated in close proximity to collapsing bubbles during cavitation. Change in microbiological content is assessed by measuring ATP in water samples before and after treatment with a turbulence inducing device. The ATP assay is based on luciferase catalyzed hydrolysis of ATP to AMP, with emission of light resulting therefrom. Results can be expresses in relative light units (flu). The ATP assay can be performed using "test pen" sampling devices from AMSA, Inc. (Midland, Mich., USA) and a luminometer such as the AMSALite™ III or AIVISALite™ IV, also from AMSA, Inc.

A Second Embodiment Turbulence Inducing Device

Figure 3:
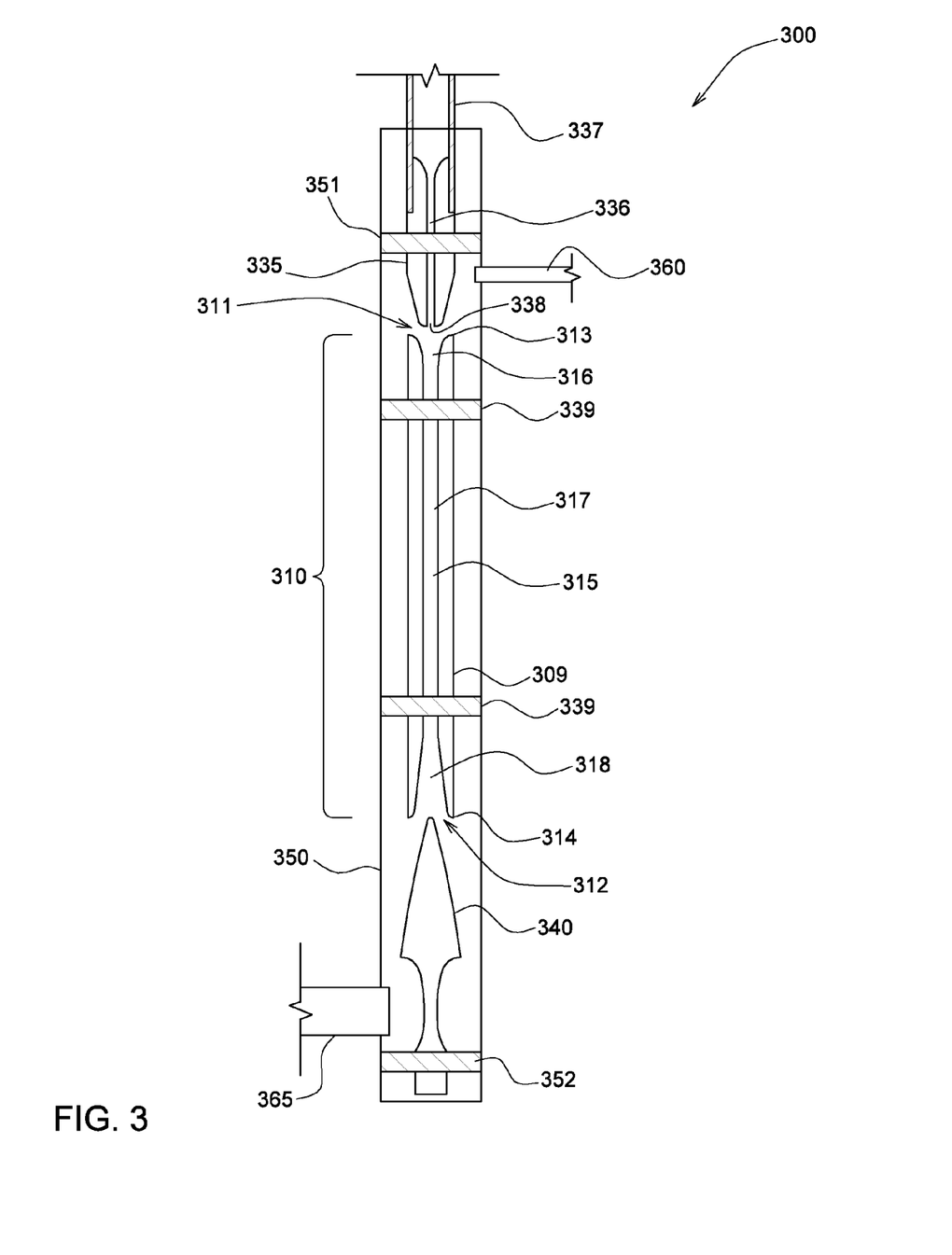
FIG. 3 is a side cross-section view of an exemplary embodiment of a turbulence inducing device.

A second embodiment turbulence inducing device 300 is illustrated in FIG. 3. The second embodiment turbulence inducing device comprises a vessel assembly 310 contained within an outer sheath 350. The vessel assembly 310 of the second embodiment is a single unitary structure, and comprises a cylindrical housing 309 through which extends a main channel 315. The main channel comprises a constriction chamber 316, a cylindrical throat 317, and a diffusion chamber 318.

The second embodiment turbulence inducing device 300 further comprises a nozzle 335 disposed proximate a vessel assembly first end 313. A nozzle bore 336 passes through a center of the nozzle, the nozzle bore being substantially cylindrical and typically having an inside diameter of approximately 0.125 inch at the nozzle discharge orifice 338. The nozzle is coupled directly to an inlet line 337, the inlet line being adapted to deliver fluid under positive pressure to the nozzle. The throat 317 typically has an inside diameter of approximately 0.350 inch. Accordingly, the ration of nozzle bore diameter to throat diameter is about 2.8.

An inlet gap 311 resides between the nozzle 335 and the vessel assembly housing 309. The inlet gap of the second embodiment is adjustable by turning the nozzle within a threaded aperture of a nozzle flange 351 that secures the nozzle within the outer sheath 350. The nozzle comprises threads that engage the nozzle flange threaded aperture (not shown). Accordingly, turning the nozzle within the nozzle flange raises or lowers the nozzle within the outer sheath 350, thereby changing the location of the nozzle relative to the vessel assembly 310 and thus adjusting the size of the inlet gap 311.

The second embodiment turbulence inducing device further comprises two inner walls 339. One or both of the inner walls provide a fluid tight barrier between the first and second ends 313, 314 of the vessel assembly 310, such that fluid communication between the first and second ends is blocked outside of the main channel 315. Fluid communication between the first and second ends of the vessel assembly through the main channel is not blocked by the inner walls. The inner walls of the second embodiment also function to secure the vessel assembly in place within the outer sheath 350. In some embodiments, inner walls do not form a fluid tight barrier, and some embodiments do not have inner walls within the outer sheath.

In typical use, a first fluid is delivered to the nozzle 335 through the inlet line 337. The fluid is typically, but not necessarily, produced water delivered to the nozzle at greater than 50 pounds per square inch (psi). Embodiments include first fluid delivered preferably at a head pressure of greater than 150 psi, more preferably at between 300 psi and 1200 psi, and most preferably at about 900 psi.

In some embodiments, space in the outer sheath 350 surrounding the inlet gap 311 becomes flooded with the produced water or other first fluid. So configured, aspiration of second fluid into the main channel 315 through the inlet gap does not occur, but cavitation within the main channel can still take place. Variations include circumstances where a dynamic equilibrium between flooded and non-flooded condition exists in the space surrounding the inlet gap. Accordingly, surges of produced water through the inlet gap can flood the space proximate the gap at one moment, and aspiration of fluid into the inlet gap can occur the next moment. Thus aspiration of fluid through the inlet gap can be intermittent.

The second embodiment turbulence inducing device 300 further comprises an obstructer 340 disposed proximate a vessel assembly second end 314. An outlet gap 312 resides between the obstructer 340 and the vessel assembly housing 309. The outlet gap 312 of the second embodiment is adjustable by turning the obstructer 340 within a threaded aperture of an obstructer flange 352 that secures the obstructer within the outer sheath 350. The obstructer comprises threads that engage the obstructer flange threaded aperture (not shown). Accordingly, turning the obstructer within the obstructer flange raises or lowers the obstructer within the outer sheath 350, thereby changing the location of the obstructer 340 relative to the vessel assembly 310 and thus adjusting the size of the outlet gap 312.

The outer sheath 350 of the third embodiment can be cylindrical, although other shapes are contemplated. The outer sheath is typically substantially rigid and defines a periphery about the nozzle 335, vessel assembly, 310, and obstructer 340. Clearance between the outer sheath and vessel assembly is preferably less than 24 inches, more preferably less than 15 inches, still more preferably less than 6.0 inches, and most preferably between 0.50 inch and 6.0 inches. The outer sheath of the third embodiment can comprise material such as stainless steel, other metals or metal alloys, polymers, composites, or other dimensionally stable material.

The second embodiment turbulence inducing device 300 further comprises a sheath inlet port 360 through which fluid is admitted within the outer sheath 350. An oxygen generator is typically employed to introduce diatomic oxygen gas ($O_2$) into the outer sheath 350 through the sheath inlet port, thereby creating oxygen enriched air within the outer sheath. The oxygen enriched air is thus available to be injected or aspirated into the inlet gap 311 as a first fluid flows through the nozzle 335 and subsequently into and through the constriction chamber 316.

In some embodiments, a gas or other fluid is forced through the inlet port 360 into the outer sheath 350 under positive pressure. Positive pressure is pressure above ambient atmospheric pressure surrounding the turbulence inducing device, the ambient atmospheric pressure typically being about one atmosphere or lower at high altitude. Variations include accumulation of gas under positive pressure inside the outer sheath 350, the positive pressure serving to force gas into the main channel 315 of the vessel assembly 310.

The turbulence inducing device 300 further comprises a sheath outlet port 365 through which fluids that exit the vessel assembly 310 through the outlet gap 312 can subsequently escape the outer sheath 350.

A Third Embodiment Turbulence Inducing Device

Figure 4:
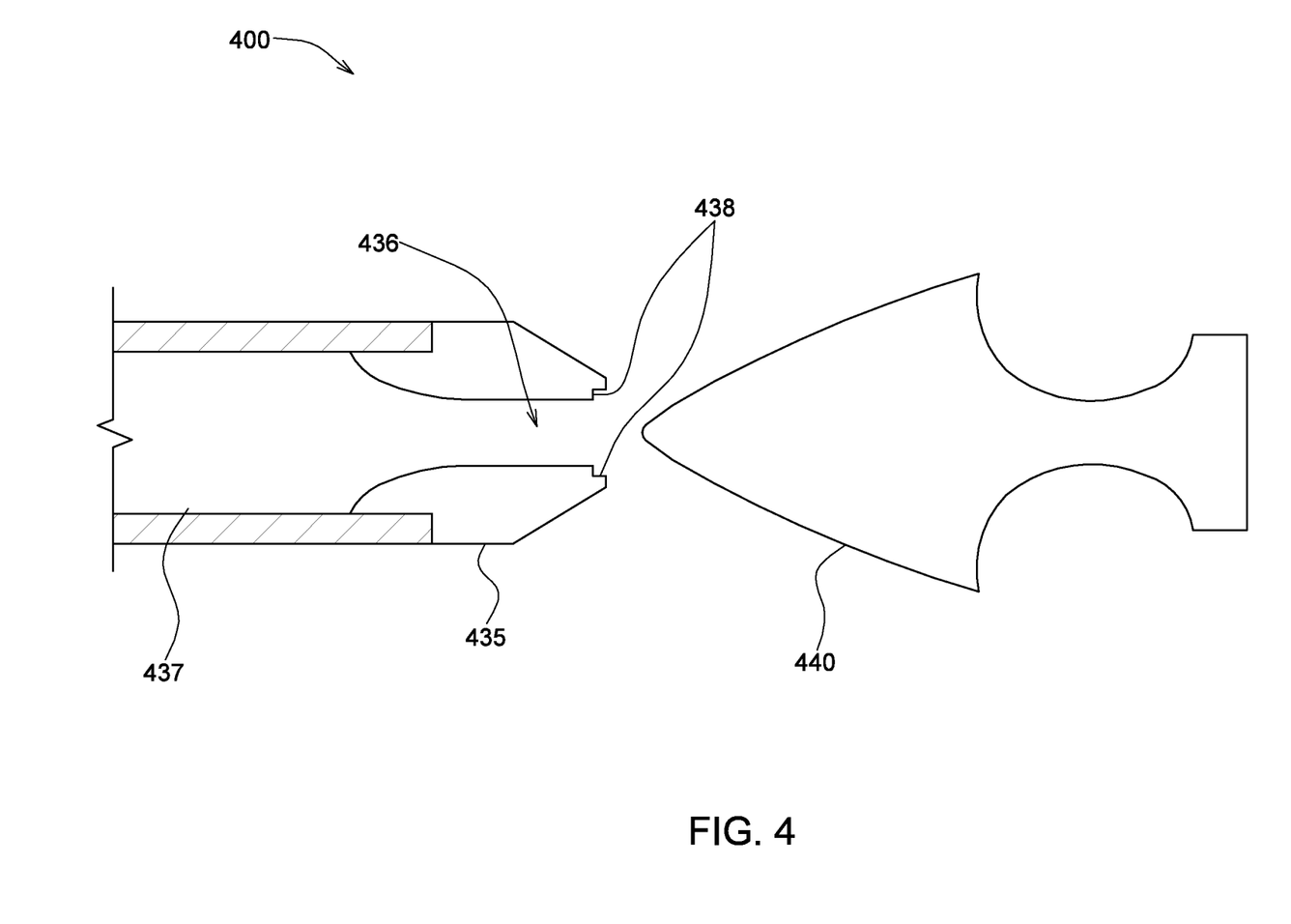
FIG. 4 is a side cross-section view of an exemplary embodiment of a turbulence inducing device.

A third embodiment turbulence inducing device 400 is illustrated in FIG. 4. The third embodiment turbulence inducing device comprises a nozzle 435 coupled directly to an inlet line 437 designed and adapted to deliver fluid to the nozzle at 1200 psi or greater. The nozzle includes a bore 436 that terminates at a nozzle discharge orifice surrounded by a stepped tip 438.

The third embodiment further comprises an obstructer 440 disposed proximate and downstream of the nozzle 435. The obstructer resides along a nozzle bore longitudinal axis, and is thus directly in the path of fluid flowing out the nozzle.

Where the fluid is water, produced water, or other aqueous medium, the third embodiment turbulence inducing device is thought to induce cavitation at some pressures. The cavitation is thought to be caused by increase in flow velocity created by the nozzle as the aqueous medium goes from a larger inside diameter of the inlet line 437 to the smaller inside diameter of the nozzle 435. It is thought that cavitation can be induced as water flows around the obstructer 440 as well. In some embodiments, the nozzle 435 and obstructer 440 are contained within an outer sheath (not shown) that confines fluid flow in relative close proximity to the obstructer, which may enhance cavitation thereabout.

The obstructer 440 of the third embodiment has an approximately conical shape, with a vertex pointed directly at the nozzle bore. Accordingly, fluid flowing through the nozzle typically strikes at or proximate the vertex and is deflected along the face of the cone or quasi-cone. Variations of obstructers have concave surfaces, flat surfaces, convex surfaces, and regular or irregular surfaces facing the nozzle and directly in the path of fluid flowing therefrom.

A Fourth Method of Using a Turbulence Inducing Device

A fourth method of using the a turbulence inducing device comprises submerging the entire device in a fluid. The fluid of the fourth method is produced water. The produced water is contained in a tank or reservoir and the device is a third embodiment turbulence inducing device 300. The produced water is recirculated through the third embodiment device, being delivered to the nozzle 335 through the inlet line 337 at between 50 psi and 1200 psi. Air can be delivered through the outer sheath inlet port 360 where it can be injected through the inlet gap 311 into the main channel 315 of the vessel assembly. In a flooded variation, the inlet port 360 is open to the tank of produced water and space inside the outer sheath 350 surrounding the inlet gap 311 is flooded, with produced water. The produced water can be aspirated through the inlet gap 311 into the main channel 315. An embodiment of the flooded configuration comprises including air in the produced water that is delivered to the nozzle 335. The fourth method further comprises dissolved air flotation to separate insoluble contamination in the produced water, the insoluble material being subsequently removed therefrom.

A Method of Heating Water

Pumping water through an embodiment of a turbulence inducing device can raise the temperature of the water. In a method of heating water, water from ten gallon test samples is pumped through a third embodiment turbulence inducing device at approximately two gallons per minute (gpm) for one, three, or five minutes. The results on water temperature for nine runs in which the starting temperature of the ten gallon test sample ranged from 65° F. to 73° F. are shown in Table III. The third embodiment turbulence inducing device comprises a nozzle having a nozzle bore of approximately 0.0625 inch. The third embodiment nozzle consists essentially of mild steel. The vessel assembly of the third embodiment is typically approximately 2.5 inches long and includes a main channel comprising a cylindrical throat having a diameter of 0.250 inch. Vessel assembly housing of the third embodiment consists essentially of brass.

TABLE III

| | Temperature degrees F. | | | |
| --- | --- | --- | --- | --- |
| | Start | 1 min | 3 mins | 5 mins |
| 1 | 67 | 72 | 84 | 105 |
| 2 | 72 | 84 | 92 | 108 |
| 3 | 69 | 72 | 96 | 107 |
| 4 | 65 | 73 | 87 | 107 |
| 5 | 73 | 81 | 88 | 105 |
| 6 | 73 | 79 | 87 | 106 |
| 7 | 70 | 84 | 88 | 109 |
| 8 | 68 | 75 | 86 | 105 |
| 9 | 69 | 72 | 93 | 106 |

A Method of Increasing Water Evaporation Rate

A method of using an embodiment of the turbulence inducing device to enhance water evaporation is described. The device is oriented vertically, with the diffusion chamber oriented upwardly and the inlet oriented downwardly. The device is disposed in a 500 gallon tank in order to capture water that does not evaporate.

Under ambient conditions of approximately 75° F., 20% relative humidity, and wind speed of about 1 mile per hour, approximately 72 gallons of water is pumped through the turbulence inducing device at approximately 2.4 gallons per minute, which results in evaporation of about 40 gallons of water, or approximately 55% of the water pumped through the device.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

Alternative embodiments of turbulence inducing devices and methods of use thereof, according to various embodiments of the present invention, are listed below:

In a first variation, a turbulence inducing device comprises:
   a vessel assembly including a first end, a second end, and
      a housing surrounding a main channel, the main channel:
         residing along a longitudinal axis and being open at the vessel assembly first and second ends;
         including a constriction chamber portion, the constriction chamber portion constricting along the longitudinal axis in a direction proceeding from the first end toward the second end;
   a nozzle residing proximate the first end of the main channel and outside the main channel, the nozzle including a nozzle bore residing along the longitudinal axis of the main channel;
   an inlet line coupled to the nozzle, the inlet nozzle being designed and adapted to deliver fluid to the nozzle;
   an obstructer residing proximate the vessel assembly second end and along the longitudinal axis of the main channel;
   an inlet gap residing at the vessel assembly first end between the nozzle and the vessel assembly; and
   an outlet gap residing between the obstructer and the vessel assembly second end.

In a second variation, the inlet gap of the first variation turbulence inducing device is size adjustable.

In a third variation, the outlet gap of first variation turbulence inducing device is size adjustable.

In a fourth variation:
   the main channel further comprises a diffusion chamber portion;

the diffusion chamber portion enlarges along the longitudinal axis in a direction proceeding from the vessel assembly first end toward the vessel assembly second end; and the constriction chamber portion resides between the first end and the diffusion chamber portion.

In a fifth variation:

the main channel further comprises a throat portion residing between the constriction chamber portion and the diffuser chamber portion, the throat portion having substantially constant cross-sectional area along the longitudinal axis.

In a sixth variation, the diffusion chamber portion resides at the vessel assembly second end.

In a seventh variation, the vessel assembly comprises multiple separably coupled sections.

In an eighth variation, the multiple separably coupled sections engage through threaded couplings.

In a ninth variation, the first variation turbulence inducing device is used according to a method including the following operations:

forcing a liquid through the nozzle and into the main channel;

injecting gas through the inlet gap, the gas becoming entrained in the liquid to form a combined fluid; and obstructing flow of the combined fluid with the obstructer.

In a tenth variation, the ninth variation further includes:

an outer sheath surrounding the nozzle, the vessel assembly, and the obstructer, the outer sheath including an inlet port proximate the nozzle and an outlet port proximate the obstructer;

forcing a liquid through the nozzle and into the main channel;

injecting gas through the inlet gap, the gas becoming entrained in the liquid to form a combined fluid; and obstructing flow of the combined fluid with the obstructer.

In an eleventh variation, the device and operations of the tenth variation further includes injecting the gas into the outer sheath through the inlet port and draining the combined fluid from within the outer sheath through the outlet port.

In a twelfth variation, the method of use of the ninth operation further includes adding a separation adjuvant to the combined fluid.

In a thirteenth variation, the method of the ninth variation further includes the liquid being delivered to the nozzle at a pressure of greater than 150 psi;

the liquid being produced water; and the gas being an oxygenated gas.

In the fourteenth variation, the method of the thirteenth variation further includes the liquid being delivered to the nozzle at a pressure between 300 psi and 1200 psi.

In a fifteenth variation, the method of the thirteenth variation further includes the liquid being delivered to the nozzle at a pressure greater than 600 psi.

In a sixteenth variation, the method of the fifteenth variation further includes the oxygenated gas comprising air.

In a seventeenth variation, the method of the fifteenth variation further includes the oxygenated gas consisting essentially of oxygen enriched air.

In an eighteenth variation, the method of the ninth variation further includes the gas comprising a combustible gas.

In a nineteenth variation, the method of the eighteenth variation further includes combustible gas comprising a hydrocarbon.

In a twentieth variation, the method of the nineteenth variation further includes hydrocarbon comprising an alkane.

In a twenty first variation, the method of the eleventh variation further includes the liquid comprising produced water and the gas including an oxygenated gas.

In a twenty second variation, the method of the twenty first variation further includes the oxygenated gas comprising air.

In a twenty third variation, the method of the twenty first variation further includes the oxygenated gas consisting essentially of oxygen enriched air.

In a twenty fourth variation, the method of the twenty first variation further includes adding a separation adjuvant to the combined fluid.

In some embodiments, fluid may be subjected to various treatments before or after treatment with the turbulence inducing device. The various treatments include, but are not limited to:

Emulsion breaking
Oil/water separation
Chemical addition
Solids settlement
Floatable collection
Media Filtration Coarse filtration
Mechanical precipitation
Mechanical recovery
Mechanical separation
Chemical modification
Disinfection
Heavy metals removal
Naturally occurring radioactive material removal
Technically enhanced naturally occurring radioactive material removal
Oxidation
Advanced Oxidation
Bio Treatment
Bio Filtration
Micro bubble entrainment
Micro bubble filtration
Membrane processes
Forward osmosis
Reverse osmosis
Pressure filtration
Gravity settlement
Lamella clarifiers
Coalescing filters
Weir tanks
Bio solids collection
Air entrainment
Dissolved air floatation
Dissolved oxygen
Ozone saturation
Ozone entrainment
Inert gas injection
Vapor extraction
Condensation
Distillation
Evaporation
Precipitation
Suspended Solids removal
Dissolved Solids removal
Waste heat utilization
Rankine engines, including organic Rankine engines
Gas Turbines Low pressure pumping
Gravity feed systems
High pressure pump
Pressure settlement.
Flocculation and/or coagulation
Low pressure capture.
Evaporation ponds
Lake mitigation
Soil remediation
Gas treatment
Off gas treatment
VOC removal
Produced water
Waste water treatment
Well water treatment
Acid Mine Drainage
Off Shore oil spill recovery
Beach clean up
Energy sources including heating sources
Wetlands mitigation.

I claim:

1. A method of reducing contamination in water comprising:
providing a turbulence inducing device, the turbulence inducing device including:
a vessel assembly including a first end, a second end, and a housing surrounding a main channel, the main channel having a longitudinal axis and being open at the vessel assembly first and second ends;
a nozzle residing proximate the first end of the vessel assembly, the nozzle including a nozzle discharge orifice and a nozzle bore residing at the nozzle discharge orifice;
an inlet line coupled to the nozzle;
an inlet gap residing at the vessel assembly first end between the nozzle and the vessel assembly;
delivering the water under positive pressure to the nozzle;
delivering a flow of the water from the nozzle into the main channel;
an obstructer including a first end portion and a concave portion, the first end portion having a rounded cone shape; and
an outlet gap between the second end of the vessel assembly and the first end portion of the obstructer, such that water exiting the second end of the vessel assembly flows through the outlet gap and then contacts the first end portion of the obstructer.

2. The method of claim 1, further comprising reducing total dissolved solids concentration in the water.

3. The method of claim 2, further comprising adding a separation adjuvant to the water.

4. The method of claim 2, wherein the water comprises produced water.

5. The method of claim 1, further comprising adding a separation adjuvant to the water.

6. The method of claim 4, further comprising delivering the produced water to the nozzle at a pressure of greater than 150 psi.

7. The method of claim 5, further comprising delivering the produced water to the nozzle at a pressure of greater than 250 psi.

8. The method of claim 4, further comprising delivering the produced water to the nozzle at a pressure of greater than 450 psi.

9. The method of claim 2, further comprising removing a solid phase contaminant from the water by physical separation.

10. The method of claim 9, wherein the solid phase contaminant comprises a solid precipitated from the water.

11. The method of claim 2, further comprising reducing microbiological content from the water.

12. The method of claim 2, further comprising inducing cavitation in the water using the turbulence inducing device.

13. The method of claim 3, wherein the vessel assembly further comprises a constriction chamber, a cross-sectional area of the constriction chamber decreasing in a direction proceeding from the first end to the second end.

14. The method of claim 2, wherein the turbulence inducing device further comprises an outer sheath surrounding the nozzle and the vessel assembly.

15. The method of claim 14, further comprising injecting air into the main channel.

16. The method of claim 14, further comprising aspirating air through the inlet gap into the vessel assembly main channel.

17. The method of claim 16, wherein fluid communication between the first end and the second end of the vessel assembly is not present through space residing inside the outer sheath and outside the main channel.

18. The method of claim 14, wherein the turbulence inducing device further comprises a fluid tight barrier residing within the outer sheath and outside the main channel, the fluid tight barrier blocking fluid communication between the first and second ends of the vessel assembly through space residing inside the outer sheath and outside.

19. The method of claim 7, further comprising adding a separation adjuvant to the produced water.

20. The method of claim 7, further comprising inducing cavitation in the water using the turbulence inducing device.

21. The method of claim 4, further comprising delivering the produced water to the nozzle at a pressure of greater than 50 psi.

22. A method of reducing contamination in produced water comprising:
providing a turbulence inducing device, the turbulence inducing device including:
a vessel assembly including a first end, a second end, and a housing surrounding a main channel, the main channel having a longitudinal axis and being open at the vessel assembly first and second ends;
a nozzle residing proximate the first end of the vessel assembly, the nozzle including a nozzle discharge orifice and a nozzle bore residing at the nozzle discharge orifice;
an inlet line coupled to the nozzle;
an inlet gap residing at the vessel assembly first end between the nozzle and the vessel assembly;
an obstructer including a first end portion and a concave portion, the first end portion having a rounded cone shape; and; and
an outlet gap between the second end of the vessel assembly and the first end portion of the obstructer, such that water exiting the second end of the vessel assembly flows through the outlet gap and then contacts the first end portion of the obstructer;
delivering the produced water to the nozzle at a pressure greater than 200 psi;
delivering a flow of the produced water from the nozzle into the main channel; and
reducing total dissolved solids concentration in the produced water.

23. The method of claim 22, further comprising adding a separation adjuvant to the produced water.

24. The method of claim 23, further comprising inducing cavitation in the produced water using the turbulence inducing device.

25. The method of claim 23, wherein the turbulence inducing device further comprises an outer sheath surrounding the nozzle and the vessel assembly.

26. The method of claim 24, wherein the turbulence inducing device further comprises an outer sheath surrounding the nozzle and the vessel assembly.

27. A turbulence inducing device comprising:
a vessel assembly including a first end, a second end, and a housing surrounding a main channel, the main channel having a longitudinal axis and being open at the vessel assembly first and second ends;
a nozzle residing proximate the first end of the vessel assembly, the nozzle including a nozzle discharge orifice and a nozzle bore residing at the nozzle discharge orifice, the nozzle bore residing along the longitudinal axis of the main channel;
an inlet line coupled to the nozzle;
an inlet gap residing at the vessel assembly first end between the nozzle and the vessel assembly;
an obstructer residing proximate the second end of the vessel assembly along the longitudinal axis of the main channel,
wherein the obstructer includes a first end portion, a concave portion, and a second end portion;
wherein the first end portion of the obstructer is selected from: a truncated cone with a planar surface normal to the longitudinal axis, a rounded cone with a convex surface facing the longitudinal axis, and a rounded cone with a concave surface facing the longitudinal axis;
wherein the concave portion includes a first section with a first radius, a second section with a second radius and a third section with a third radius; and
wherein both the first radius and the third radius are greater than the second radius; and
an outlet gap between the second end portion of the vessel assembly and the first end of the obstructer, such that water exiting the second end of the vessel assembly flows through the outlet gap and then contacts the first end portion of the obstructer.

28. The turbulence inducing device of claim 27, wherein a nozzle bore cross-sectional area at the nozzle discharge orifice is smaller than a main channel cross-sectional area minimum.

29. The turbulence inducing device of claim 28, wherein the main channel cross-sectional area minimum is at least twice the nozzle bore cross-sectional area at the nozzle discharge orifice.

30. The turbulence inducing device of claim 27, wherein a main channel cross-sectional area minimum is at least four times a nozzle bore cross-sectional area at the nozzle discharge orifice.

31. The turbulence inducing device of claim 27, further comprising an outer sheath surrounding the nozzle and the vessel assembly, a clearance between the outer sheath and the vessel assembly being less than 24 inches.

32. The turbulence inducing device of claim 29, further comprising an outer sheath surrounding the nozzle and the vessel assembly, a clearance between the outer sheath and the vessel assembly being less than 24 inches.

33. The turbulence inducing device of claim 27, wherein the obstructer is positioned such that the first end portion of the obstructer is positioned proximate to the second end of the vessel assembly.

* * * * *